US011899682B2

United States Patent
Del Villar et al.

(10) Patent No.: US 11,899,682 B2
(45) Date of Patent: Feb. 13, 2024

(54) GENERATING AND PRESENTING A SEARCHABLE GRAPH BASED ON A GRAPH QUERY

(71) Applicant: Microsoft Technology Licensing, LLC, Redmond, WA (US)

(72) Inventors: Paul Pangilinan Del Villar, Bothell, WA (US); Mohamed Abdelrhman Mostafa Ali Elfeki, Renton, WA (US); Pramod Kumar Sharma, Seattle, WA (US); Nilgoon Zarei, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/469,638

(22) Filed: Sep. 8, 2021

(65) Prior Publication Data
US 2023/0073220 A1    Mar. 9, 2023

(51) Int. Cl.
*G06F 16/26* (2019.01)
*G06F 16/901* (2019.01)
*G06F 3/04817* (2022.01)

(52) U.S. Cl.
CPC .......... *G06F 16/26* (2019.01); *G06F 3/04817* (2013.01); *G06F 16/9024* (2019.01)

(58) Field of Classification Search
CPC ... G06F 16/26; G06F 3/04817; G06F 16/9024
See application file for complete search history.

(56) References Cited

U.S. PATENT DOCUMENTS

| 10,505,884 B2 | 12/2019 | Hentschel et al. |
| 10,997,257 B2 | 5/2021 | Stoyanov et al. |
| 2015/0058079 A1 | 2/2015 | Freund et al. |

(Continued)

FOREIGN PATENT DOCUMENTS

WO    2020035934 A1    2/2020

OTHER PUBLICATIONS

Misraa, et al., "Multi-Modal Retrieval using Graph Neural Networks", In Repository of arXiv:2010.01666v1, Oct. 4, 2020, 8 Pages.

(Continued)

*Primary Examiner* — Andrey Belousov
(74) *Attorney, Agent, or Firm* — Ray Quinney & Nebeker; James Bullough

(57) ABSTRACT

The present disclosure relates to selectively analyzing digital content items from a social networking system to generate a searchable graph object that facilitates visualization of correlations between entities of interest (e.g., brands, products, services, companies), concepts (e.g., domain-specific and/or general terms), hashtags, and other output classes. For example, systems described herein involve collecting images and/or videos that are publicly available via a social networking platform and evaluating content and metadata thereof to identify entities of interest therein and predict various concepts therein to generate a graph object that provides a searchable matrix. The systems herein provide a mechanism for processing a graph query that presents a relational graph showing correlations between the query and the various output classes.

20 Claims, 6 Drawing Sheets

(56) References Cited

U.S. PATENT DOCUMENTS

| | | |
|---|---|---|
| 2016/0378757 A1 | 12/2016 | Bahl |
| 2017/0046427 A1* | 2/2017 | Tang ..................... G06F 16/54 |
| 2018/0089541 A1 | 3/2018 | Stoop et al. |
| 2018/0302682 A1 | 10/2018 | Saxena et al. |
| 2018/0322155 A1 | 11/2018 | Alonso et al. |
| 2019/0182059 A1 | 6/2019 | Abdou et al. |
| 2020/0250249 A1 | 8/2020 | Fedoryszak et al. |
| 2021/0157858 A1 | 5/2021 | Stevens et al. |
| 2022/0092105 A1* | 3/2022 | Barros ................. G06F 16/535 |

OTHER PUBLICATIONS

Pilar, et al., "Framework for Social Media Analysis Based on Hashtag Research", In Journal of applied Sciences, vol. 11, Issue 8, Apr. 20, 2021, pp. 1-18.

Zhong, et al., "A Graph-based Approach to Explore Relationship between Hashtags and Images", In Proceedings of International Conference on Web Information Systems Engineering, Jan. 19, 2020, pp. 1-15.

"International Search Report and Written Opinion Issued in PCT Application No. PCT/US22/038608", dated Dec. 13, 2022, 10 Pages.

* cited by examiner

GENERATING AND PRESENTING A SEARCHABLE GRAPH BASED ON A GRAPH QUERY

BACKGROUND

Recent years have seen a significant increase in the use of computing devices (e.g., mobile devices, personal computers, server devices) to create, store, analyze, and present data from various sources. Indeed, tools and applications for collecting, analyzing, and presenting data are becoming more and more common. These tools provide a variety of features for displaying data about various entities. As entities become more complex, however, conventional methods for collecting, analyzing, and presenting data have a number of limitations and drawbacks.

For example, conventional techniques for analyzing and presenting data often rely on focus groups and surveys for collection and analysis of the data. Other techniques may simply require large quantities of manpower to observe and analyze various types of content to gain meaningful insight. Each of these techniques generally involve significant costs as a result of time and manpower needed to collect sufficient data and gain meaningful insights. Moreover, conventional techniques for collecting, analyzing, and presenting data are often limited to a specific snapshot at a given time period and becomes obsolete over time.

These and other problems exist in connection with collecting, analyzing, and presenting data.

DETAILED DESCRIPTION

Figure 1:
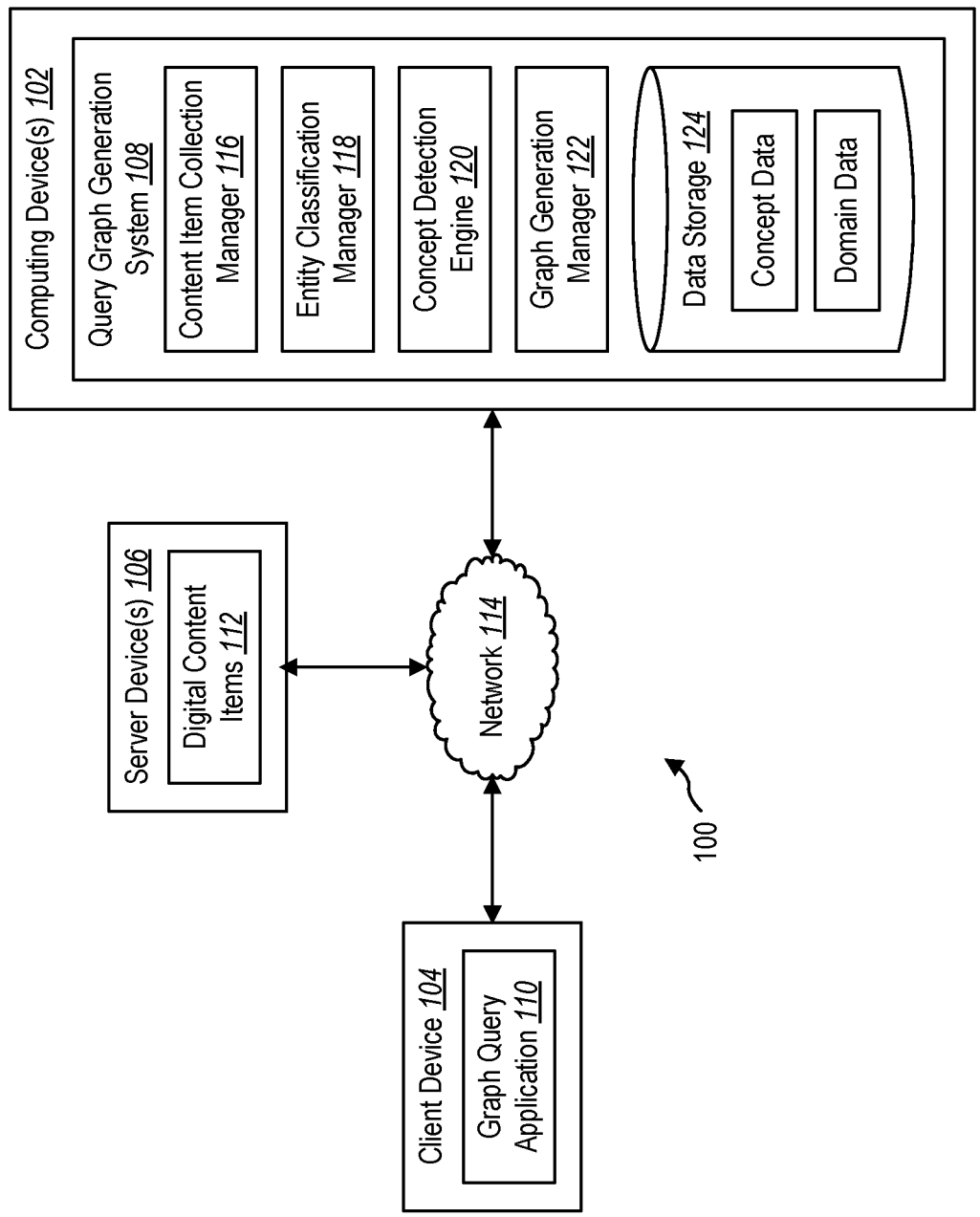
FIG. 1 illustrates an example environment including a query graph generation system in accordance with one or more embodiments.

The present disclosure relates to systems and models for selectively analyzing a set of digital content items to generate a searchable graph object that enables a user to visualize correlations between entities of interest (e.g., brands, products, services, companies) and various concepts (e.g., domain-specific and/or general terms) found within the digital content items. In particular, one or more embodiments described herein involve collecting digital content items (e.g., images, videos) that are publicly available via a social networking system and identifying a subset of the digital content items that have one or more entities of interest found therein. The subset of digital content items can further be evaluated to identify various concepts that are predicted to be present within the digital content items. Further, the query graph generation system can generate a correlation graph object (or simply "graph object") including a searchable matrix that includes concept identifiers, identified entities of interest, and correlation values that collectively provide a searchable object capable of indicating frequency of co-occurrences between various concepts and entities of interest. These correlations between various output classes may be represented via a relational diagram based on a query of the graph object.

As an illustrative example, one or more embodiments described herein relate to a query graph generation system that identifies a collection of digital content items (e.g., images from a social networking platform). The query graph generation system may apply an entity detection model to the digital content items that is trained to identify digital content items that include one or more entities of interest within visual content of the digital content items. The query graph generation system may further receive a set of concept identifiers for the digital content items indicating one or more concepts (e.g., domain and/or general concepts) that are present within the digital content items. The query graph generation system may further generate a correlation graph object for the subset of digital content items that includes a searchable matrix. As will be discussed in further detail below, the searchable matrix may include entities of interest, concept identifiers, and a plurality of correlations having correlation values that indicate frequency of co-occurrence between respective entities of interest and concept identifiers that were identified for the individual digital content items.

The present disclosure provides a number of practical applications that provide benefits and/or solve problems associated with collecting digital content items, analyzing the digital content items to determine various characteristics of the digital content items, and generating a searchable graph object that enables an individual to process a query with respect to the digital content items and identify relationships between the various concepts and/or entities of interest. By way of example and not limitation, some of these benefits will be discussed in further detail below.

For example, the query graph generation system provides features and functionality that enables identifying and analyzing correlations between entities of interest and concepts that are detectable within images, videos, and other digital content items. Indeed, where focus groups and surveys have been used in the past to gain insights and identify concepts with respect to multi-media content, the query graph generation system utilizes a number of models discussed herein to consider a combination of digital content and metadata to identify entities of interest and concepts that are present in a collection of digital content items.

In addition to considering images, videos, and other digital content items in determining correlations between various concepts and entities, the query graph generation system can further generate a searchable object on which a query can be performed. Indeed, where queries have often limited to performing searches on structured data, the query graph generation system provides a mechanism for a user to identify concepts and entities with respect to images, videos, and other digital content item that would not otherwise be searchable with conventional search queries. Moreover, as will be discussed below, the query graph generation system provides a number of unique and non-conventional techniques for displaying and otherwise presenting the correlations within a displayable correlation graph presentation.

The query graph generation system may additionally provide features and functionality that enable the system to determine correlations in an unbiased way. For example, by applying an entity detection model, a concept identification model, and by applying one or more unbiased models to determine specific correlations, the query graph generation system can generate a correlation graph object that includes an unbiased representation of entities, concepts, and associated correlations. As will be discussed below, the query graph generation system can provide this unbiased approach while simultaneously allowing a user to view correlations for domain-specific concepts, providing insights related to both known concepts as well as unknown concepts with respect to one or more entities of interest.

The query graph generation system also provides a number of features related to scalability of one or more embodiments described herein. For example, by identifying a subset of digital content items that are determined to be associated with one or more entities of interest, the query graph generation system may significantly reduce the number of digital content items that are analyzed in determining presence of concepts therein. Moreover, as will be discussed below, the query graph generation system can further filter out both universal correlations and rare correlations to ensure that a displayed graph is not dominated by irrelevant or otherwise less useful correlations within a graph object.

Moreover, the query graph generation system provides a dynamic approach that enables the graph object to be updated or iteratively modified over time. For example, where conventional surveys and study groups provide information for an entity of interest at a specific point in time that can quickly become outdated, the query graph generation system may update a correlation graph by collecting additional photos over a recent period of time. The query graph generation system may consider the additional digital content items while keeping or otherwise considering digital content items that have been previously analyzed and considered in generating a previous version of the correlation graph. This enables the query graph generation system to consider more recent digital content items without performing a new analysis on each of the previously collected digital content items that may still be relevant to a current version of the correlation graph.

As illustrated in the foregoing discussion, the present disclosure utilizes a variety of terms to describe features and advantages of one or more embodiments of a query graph generation system. Additional detail will now be provided regarding the meaning of some of these terms.

For example, as used herein, a "digital content item" or "content item" may refer to a defined portion of digital data (e.g., a data file). Examples of digital content items include digital images, video files, audio files, streaming content, and/or folders that include one or more digital content item. It is appreciated that digital content can refer to content stored on or otherwise accessible to the query graph generation system.

As noted above, the query graph generation system may receive or otherwise collect digital content items from a social networking system. As used herein, a "social networking system" may refer to any communication platform on which digital content items can be stored and shared between users of the communication platform. In one or more embodiments described herein, digital content items may be collected from a set of content items that have been published publicly or have been otherwise made accessible publicly to other users of the social networking system.

As used herein, an "entity of interest" (or simply "entity") may refer to an identifiable object within a digital content item that may be tagged to the content item in accordance with one or more embodiments. For example, in one or more embodiments described herein, an entity of interest refers to a brand, a product, a company, a trademark, or other identifiable entity that may be identified based on evaluation of the digital content item. In one or more embodiments, the entity of interest may be identified based on metadata, such as a hashtag, source information, timing information (e.g., timestamps) or other information associated with the digital content item independent from displayable content of the digital content item. In one or more embodiments, the entity of interest is identified based on a combination of content (e.g., an image) and metadata (e.g., one or more hashtags) associated with a digital content item.

As used herein, a "concept" may refer to a specific term that may be associated with a digital content item. For example, in one or more embodiments, a concept may refer to a term selected from a collection of predefined terms that may be associated with a digital content item based on a concept detection model determining (e.g., predicting) that a particular concept is present within a given digital content item. In one or more embodiments described herein, a concept may refer to a domain concept, which may refer to a selected concept (e.g., a user-selected concept) that a user identifies prior to running a query on a correlation graph. Alternatively, a concept may refer to a general concept, which may refer to any non-selected concepts from a collection of possible concepts that may be associated with a corresponding digital content item. Additional information associated with concepts will be discussed herein in connection with various example implementations.

Additional detail will now be provided regarding a query graph generation system in accordance with one or more example implementations. For example, FIG. 1 illustrates a block diagram showing an environment 100 having one or more computing device(s) 102 on which a query graph generation system 108 may be implemented in accordance with one or more embodiments. The environment 100 further includes a client device 104 having a graph query application 110 thereon and one or more server device(s) 106 providing access to a collection of digital content items 112 (e.g., publicly accessible digital content items shared via a social networking system).

As shown in FIG. 1, the computing device(s) 102, client device 104, and server device(s) 106 may communicate with each other directly or indirectly through a network 114. The network 114 may include one or multiple networks and may use one or more communication platforms or technologies suitable for transmitting data. The network 114 may refer to any data link that enables the transport of electronic data between devices and/or modules of the environment 100. The network 114 may refer to a hardwired network, a wireless network, or a combination of hardwired and wireless networks. In one or more embodiments, the network 114 includes the Internet.

The computing device(s) 102, client device 104, and/or server device(s) 106 may refer to various types of computing devices. For example, in one or more embodiments, the client device 104 may include a mobile device, such as a mobile telephone, a smartphone, a PDA, a tablet, or a desktop. In one or more embodiments, the client device 104 may include a non-mobile device such as a desktop computer, server device, or other non-portable device. In one or more embodiments described herein, the computing device(s) 102 refers to one or more server devices of a cloud computing system accessible to a client device 104 operated by a user. In one or more implementations, the server device(s) 106 refers to one or more third-party server device(s) independent from the computing device(s) 102. Each of the computing device(s) 102, client device 104, and server device(s) 106 may include features and functionality described below in connection with FIG. 5.

As shown in FIG. 1, and as will be discussed in further detail below, the query graph generation system 108 may include a content item collection manger 116, an entity classification manager 118, a concept detection engine 120, a graph generation manager 122, and data storage 124 thereon. It will be appreciated that while FIG. 1 illustrates an example in which each of these components 116-124 are implemented in whole on the computing device(s) 102, other implementations may include one or more components (or subcomponents) implemented across different devices of the environment 100. As a non-limiting example, the concept detection engine 120 may be implemented on a different set of devices (or different cloud computing platform altogether) than the entity classification manager 118 and/or the graph generation manager 122. As another example, while FIG. 1 shows an example in which the graph query application 110 is implemented on the client device 104, in one or more embodiments, one or more features or functionalities of the graph query application 110 may be implemented on the query graph generation system 108 implemented on the one or more computing device(s) 102. Thus, while one or more embodiments described herein will be discussed in connection with a similar configuration of devices as shown in the environment 100, features and functionality of the systems and applications described herein may similarly apply to other device environments.

As mentioned above, and as will be discussed in further detail below, the query graph generation system 108 may include a content item collection manager 116. The content item collection manager 116 can collect or otherwise obtain access to a collection of digital content items 112. For example, in one or more embodiments, the content item collection manager 116 collects digital content items from a social networking system hosted by the server device(s) 106. In one or more implementations, the content item collection manager 116 collects digital content items from a plurality of social media platforms that provide access to digital content items shared by users of the respective platforms. In one or more implementations described herein, the content item collection manager 116 exclusively collects digital content items that have been made publicly accessible by the individuals that uploaded or otherwise shared the digital content items to other users of the social networking system(s).

As shown in FIG. 1, the query graph generation system 108 may further include an entity classification manager 118. Upon receiving or otherwise obtaining access to the collection of digital content items 112, the entity classification manager 118 can apply an entity detection model to the digital content items to identify a plurality of digital content items associated with one or more entities of interest. For example, and as will be discussed in further detail below, the entity classification manager 118 may apply an entity detection model that is trained to evaluate metadata and/or visual content of the collection of digital content items 112 to identify a subset of digital content items that include one or more entities of interest therein. The entity detection model may refer to a machine learning model or other neural network that is trained on a set of training images to predict whether a particular entity of interest is present within visual content of a given digital content item. As noted above, the entity classification manager 118 can identify a subset of digital content items including the one or more entities of interest to provide for further analysis to other components of the graph query generation system 108.

As shown in FIG. 1, the query graph generation system 108 may further include a concept detection engine 120. As noted above, the concept detection engine 120 may be implemented on the same or different computing device as other components of the query graph generation system 108. In one or more embodiments, the concept detection engine 120 may evaluate content of the subset of digital content items to determine whether one or more concepts exist within the digital content items. For example, in one or more embodiments, the concept detection engine 120 may implement a content detection model trained to determine whether one or more concepts from a predefined list of concepts (e.g., for which the content detection model has been specifically trained) are present within a given digital content item. While one or more embodiments describe a content detection model trained to detect concepts within an image, other implementations may be trained to detect or otherwise identify concepts within other types of digital content items (e.g., videos, audio files) using similar features and functionalities discussed herein. Additional detail in connection with the concept detection engine 120 will be discussed below in connection with FIG. 2.

As further shown in FIG. 1, the query graph generation system 108 may include a graph generation manager 122. As will be discussed below, the graph generation manager 122 may evaluate the identified concepts and entities of interest within the digital content items from the filtered subset of digital content items to determine correlations between the concepts and/or entities of interest found therein. In particular, the graph generation manager 122 may identify correlations and associated correlation values indicating frequency of co-occurrence of various concepts and/or entities of interest and generate a searchable matrix including the correlations, entities of interest, and content identifiers indicating presence of the concepts within the digital content items.

In one or more embodiments, the graph generation manager 122 generates a correlation graph object including the searchable matrix and provides a presentation of the correlation graph object on the client device 104. For example, in one or more embodiments, the graph generation manager 122 hosts a presentation service and provides a presentation of the correlation graph object via a graphical user interface on the client device 112. For example, in one or more embodiments, a user of the client device 104 may use the graph query application 110 to generate and provide a query including an identified term, hashtag, or concept that may be used to generate a presentation of the correlation graph object responsive to the query. In this example, the graph query application 110 may refer to a web browser or an application that provides access to the correlation graph object maintained on the computing device(s) 102.

As an alternative to the query graph generation system 108, in one or more embodiments, the graph generation manager 122 provides the correlation graph object to the client device 104 for use in executing or otherwise processing any number of graph queries. For example, the correlation graph object may be provided to the client device 104 and a graph query application 110 on the client device 104 may be used to locally conduct graph queries (or simply "queries") on the correlation graph object. As will be discussed in further detail below, the graph queries may include a variety of inputs for instructing the graph query application 110 to generate a presentation showing selective correlations between a query term and one or more of concepts and entities of interest identified in connection with the subset of digital content items.

As further shown in FIG. 1, the query graph generation system 108 includes a data storage 124. The data storage 124 may include data thereon that is accessible to one or more components of the query graph generation system 108 for performing any of the features and functionalities discussed herein. For example, as shown in FIG. 1, the data storage 124 includes concept data, which may include a collection of terms for which a concept detection identifier is trained to detect. In one or more embodiments, the concept data may include any data that makes up the concept detection model itself, including any algorithms, training data, and any other information that enables the concept detection engine 120 to determine whether one or more concepts are present within a given digital content item.

The data storage 124 may further include domain data. The domain data may include any information associated with the entities of interest and/or specific concepts of interest to a particular individual or organization. For example, in one or more embodiments, the domain data may include an identification of any entities of interest from which the subset of digital content items is identified. The domain data may further include any information about the entity detection model used to evaluate the collection of digital content items 112 to identify the subset of digital content items having the entities of interest therein. The domain data may also include any received indication of one or more concepts of interest that may be used in generating the correlation graph object and/or presenting the correlation graph object via a graphical user interface of the client device 104.

Additional detail will now be discussed in connection with an example workflow performed by components of the graph query generation system 108 and the graph query application 110. For example, FIG. 2 illustrates an example workflow 202 showing an example implementation for collecting digital content items, identifying a subset of digital content items based on identified entities of interest therein, tagging or otherwise associating the subset of digital content items with one or more concepts, and generating a correlation graph object that facilitates selective presentation of data from the correlation graph object in accordance with one or more embodiments herein.

Figure 2:
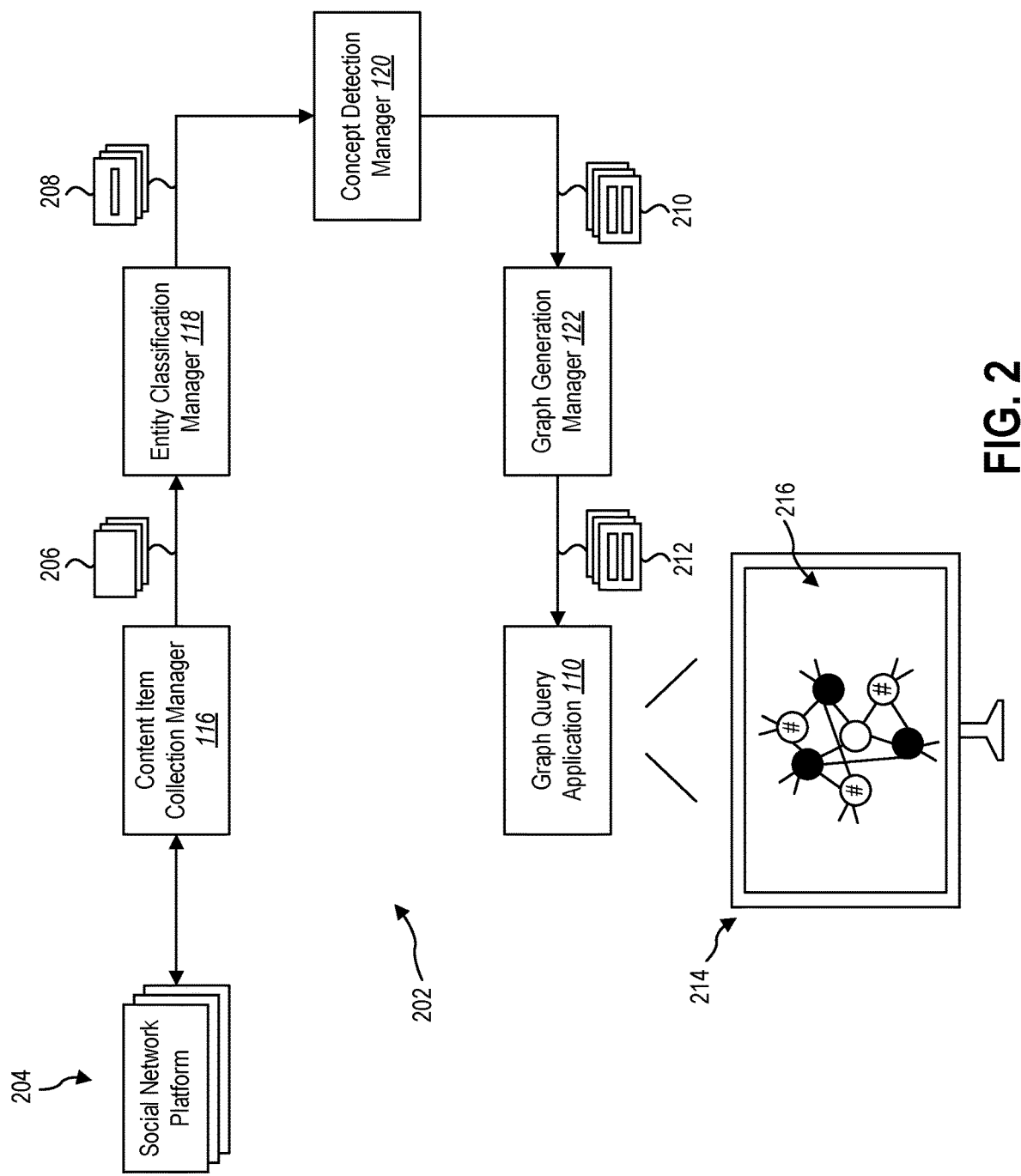
FIG. 2 illustrates an example workflow showing an implementation in which the query graph generation system generates a searchable graph object for presentation on a graphical user interface of a client device in accordance with one or more embodiments.

As shown in FIG. 2, a content item collection manager 116 can collect digital content items from one or multiple social networking platforms 204. In one or more embodiments, the content item collection manager 116 may mine social media posts including digital content items and provide the collection of digital content items 206 and associated information to the entity classification manager. By way of example, the content item collection manager 116 can identify a set of digital content items and include metadata of the digital content items in conjunction with information included within a social media posts (e.g., geolocation, timestamp, hashtags, comments) to the entity classification manager 118.

Upon receipt of the digital content items and associated information, the entity classification manager 118 can analyze content and/or metadata of the digital content items to identify any of the digital content items having one or more entities of interest included therein. For example, the entity classification manager 118 may receive an identification of one or more entities of interest and apply an entity detection model to the digital content items collected to identify any number of the digital content items having the identified entities of interest therein. As will be discussed below, this may be based on an analysis of visual content included within the digital content items. In one or more embodiments, the entity classification manager 118 may analyze a combination of visual content and metadata associated with the respective digital content items.

As noted above, the entity classification manager 118 may implement an entity detection model that has been trained to identify any number of entities of interest within the digital content items. In one or more embodiments, the entity classification manager 118 manages training and/or refining of the digital content items based on training images (and/or associated metadata) and corresponding ground truths. Alternatively, in one or more embodiments, the entity classification manager 118 receives an entity detection model having been previously trained to identify entities of interest of a particular type within digital content items. In one or more embodiments, the entity detection model may be trained exclusively for a set of entities of interest. Accordingly, it will be understood that, in some embodiments, an entity detection model would need to be trained to detect different types of entities for different domains.

As a non-limiting example that will be discussed in connection with various embodiments herein, the entity classification manager 118 may apply an entity detection model to each digital content item from the collection of digital content items 206 to identify whether visual content of the digital content items include a particular brand of drink. For instance, the entity detection model may be trained to evaluate visual content and identify a presence of a beer, soda, or other beverage within content of the digital content items. The entity detection model may further be trained to consider a combination of visual content and metadata associated with the digital content item (e.g., hashtags, geolocation) to determine a particular type or brand of the identified beverage. For example, the entity detection model may be trained to identify any one of fifty brands of drinks that are included within visual content of digital content items based on visual content and metadata associated therewith. In one or more embodiments, where the digital content item is obtained via a social networking system and includes publicly accessible comments from other users, the entity detection model may further be trained to consider text provided by other users in detecting the presence of the beverage and/or particular brand (e.g., in addition to hashtags, geolocation data, timestamps, source data, and other metadata).

As shown in FIG. 2, the entity classification manager 118 may identify a subset of digital content items 208 including a tagged classification indicating one or more entities of interest that were determined to appear with respect to the corresponding digital content items. As noted above, by identifying the subset of digital content items 208, the entity classification manager 118 may significantly reduce processing expense going forward in further evaluating digital content items to identify concepts and effectively determining correlations between the concepts, entities, and query term(s).

In addition to generally identifying the subset of digital content items 208, in one or more embodiments, the entity classification manager 118 can provide an indication of which entity of interest(s) and/or hashtag(s) are associated with the respective digital content items. As an example, in one or more embodiments, the entity classification manager 118 may build association matrices including an entity class (e.g., a brand, denoted by B) and hashtags (denoted by H) that are associated with a corresponding digital content item from the subset of digital content items. As shown in FIG. 2, the entity classification manager can provide the subset of digital content items 208 including the tagged classes and/or hashtags to the concept detection engine 120.

As shown in FIG. 2, the concept detection engine 120 can evaluate the subset of digital content items 208 to determine whether one or more concepts are present within respective digital content items. In one or more embodiments, the concept detection engine 120 runs a concept detection model that has been trained to recognize existence of textual concepts within a given image. For example, in one or more implementations, the concept detection engine 120 makes use of a one-shot transferable text-visual model including one or more machine learning models that have been trained to estimate a probability that a given image includes a text concept portrayed or otherwise represented therein.

By way of example, the concept detection model may be trained to determine a probability that each concept of a collection of concepts is present or otherwise exists within a digital content item. In one or more embodiments, the concept detection engine 120 generates a probability including a normalized confidence score for each concept of a collection of concepts and a probability that the concept(s) exists within a digital content item. The concept detection engine 120 may apply an algorithm to both domain and general concepts to create probability scores (e.g., probability tensors D, G) representing domain concept and general concept existence probability for a given digital content item. In one or more embodiments, the concept detection engine 120 determines a probability for each word of a collection of 3000-4000 words representing upwards of 3000-4000 concepts.

The concept detection engine 120 may provide a set of tagged digital content items 210 to the graph generation manager 122 including the classifications tagged by the entity classification manager 118 and the concepts identified by the concept detection engine 120. In one or more embodiments, the concept detection engine 120 may simply provide concept identifiers for each of the concepts that are present within the digital content items. For example, in one or more embodiments, the concept detection engine 120 may determine that a concept is present based on a probability for the concept exceeding a threshold probability value. Alternatively, in one or more embodiments, the concept detection engine 120 simply provides the probability values for each of concepts in connection with the digital content items for further analysis by the graph generation manger 122 in creating the correlation graph object.

While FIG. 2 illustrates an example in which the concept detection engine 120 provides the tagged digital content items 210 including the subset of digital content items 208 in combination with the classification information (e.g., identified entities of interest) and the concept data (e.g., concept identifiers and/or probability values), the subset of digital content items 208 may not necessarily be provided to the graph generation manager 122. For example, in one or more embodiments, the graph generation manager 122 may simply receive some or all of the metadata (e.g., hashtags), identified classes (e.g., entities of interest) and concept identifiers (e.g., concept IDs and/or probability values) for use in generating the correlation graph object without any further analysis of the content of the digital content items.

As indicated above, the graph generation manager 122 may generate a correlation graph object for the subset of digital content items based on the information received for the digital content items. In one or more embodiments, the graph generation manager 122 may filter out one or more concepts based on a comparison of the probability scores and various thresholds. For example, in one or more embodiments, the graph generation manager 122 may eliminate or otherwise filter out correlations where probability scores exceed a maximum threshold value (e.g., universal correlations) indicating a universal or near-universal correlation between various entities of interest and corresponding concept(s). In addition, in one or more embodiments, the graph generation manager 122 may eliminate or otherwise filter out correlations where probability scores are less than a minimum threshold value (e.g., rare correlations) indicating rare or non-existent correlations between various entities of interest and corresponding concept(s). In one or more embodiments, the maximum and minimum threshold values may refer to threshold values higher or lower than a corresponding correlation value. Alternatively, in one or more embodiments, the maximum and minimum threshold values may refer to percentile values corresponding to high and low groupings of correlation values. For example, in one or more embodiments, the graph generation manager 122 may remove a top percentile (e.g., top 5%) of correlation values. The graph generation manager 122 may similarly remove a low percentile (e.g., lowest 5%) of correlation values.

As an illustrative example, where a task is finding insights relative to entities of interest including various beer brands, certain concepts of "beers," "alcohol," and other similar concept may be present in virtually all digital content items from the subset of digital content items 208 between the identified entities of interest and corresponding "beer" and "alcohol" concepts. In contrast, one or more concepts may never (or very rarely) appear in connection with the subset of digital content items 208 for the entities of interest featuring beer brands resulting in a near-zero correlation between the entities and selective concepts. In this example, the concept detection engine 120 (or graph generation manager 122) may eliminate these concepts from the correlation graph object by removing the correlations and/or concepts from the searchable matrix or simply flagging certain correlations and concepts as universal or insignificant within the correlation graph object.

In one or more embodiments, the graph generation manager 122 utilizes the association matrices generated by the entity classification manager 118 and the filtered probability tensors generated by the concept detection engine 120 to construct a join co-existence matrix (C) by merging all of the concepts that exist in a single image. In this example, the resulting matrix (C) for the digital content item may be expressed as follows: C=(d|g|h|b). The graph generation manager 122 may then construct a pairwise similarity and co-existence probability tensor (P) on the joint tensor. This may be done by performing an outer product on the tensor that outputs a correlation value between each concept in a tensor and all other concepts in a given matrix expressed as follows: $P = C \odot C^T$. This calculation between C and $C^T$ may provide pair-wise similarities (e.g., correlations) between each concept and other concepts. A resulting probability tensor (P) may include a universal graph with the corpus including nodes and probabilities referring to weights on each edge between the nodes. More generally, the nodes may illustrate various entities of interest, concepts, hashtags, and other variables with the edges between the nodes indicating correlation values associated with frequency of co-occurrence between respective entities, concepts, and/or hashtags represented within the correlation graph object.

In one or more embodiments, the graph generation manager 122 provides the correlation graph object to a graph query application 110 for generating or otherwise facilitation presentation of the graph object on a graphical user interface of a client device. For example, as shown in FIG. 2, upon receipt of the query graph object 212, the graph query application 110 may process a graph query and provide a presentation of the graph object in accordance with the graph query. In particular, as shown in FIG. 2, and as will be discussed in further detail in connection with FIGS. 3A-3C below, the graph query application 110 can cause a client device 214 to present a relational diagram for a query on a graphical user interface 216 of the client device 214.

As noted above, the graph query application 110 may utilize the correlation graph object generated in accordance with one or more embodiments described herein and generate a presentation of the correlation graph object based on a received graph query. In particular, as will be discussed below, the graph query application 110 can generate a presentation for a query in accordance with the correlation graph object to display a relational diagram showing correlations between term(s) of the query and output classes represented within the correlation graph object. As used herein, an "output class" may refer to a category of output, such as an entity of interest from a set of entities of interest, a domain concept from a set of domain concepts, a general concept from a set of general concepts, a hashtag from a set of hashtags, or other category of data or that may be represented by a node within the displayed query result(s). Indeed, an output class may include any term that is represented within a searchable matrix of a correlation graph object that may be surfaced in response to a graph query. Additional detail will be discussed in connection with example representations of the correlation graph object based on different graph queries below.

Figure 3A:
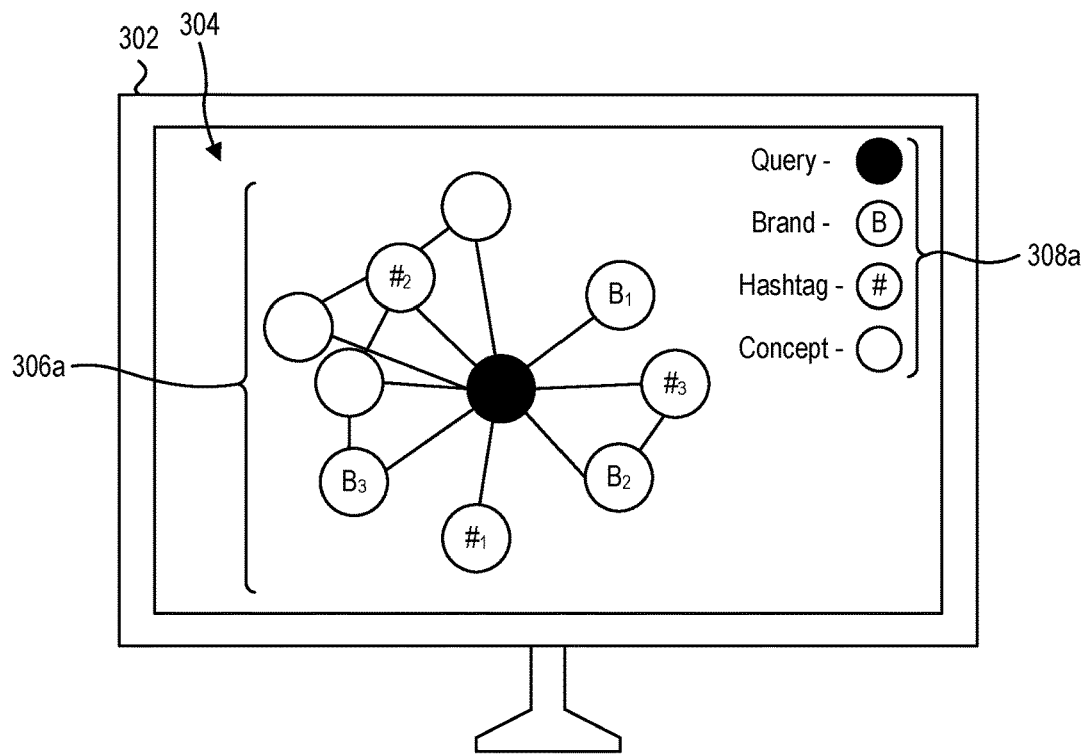
FIGS. 3A-3C illustrate example presentations of a searchable graph object generated and presented by a query graph generation system in accordance with one or more embodiments.
Figure 3B:
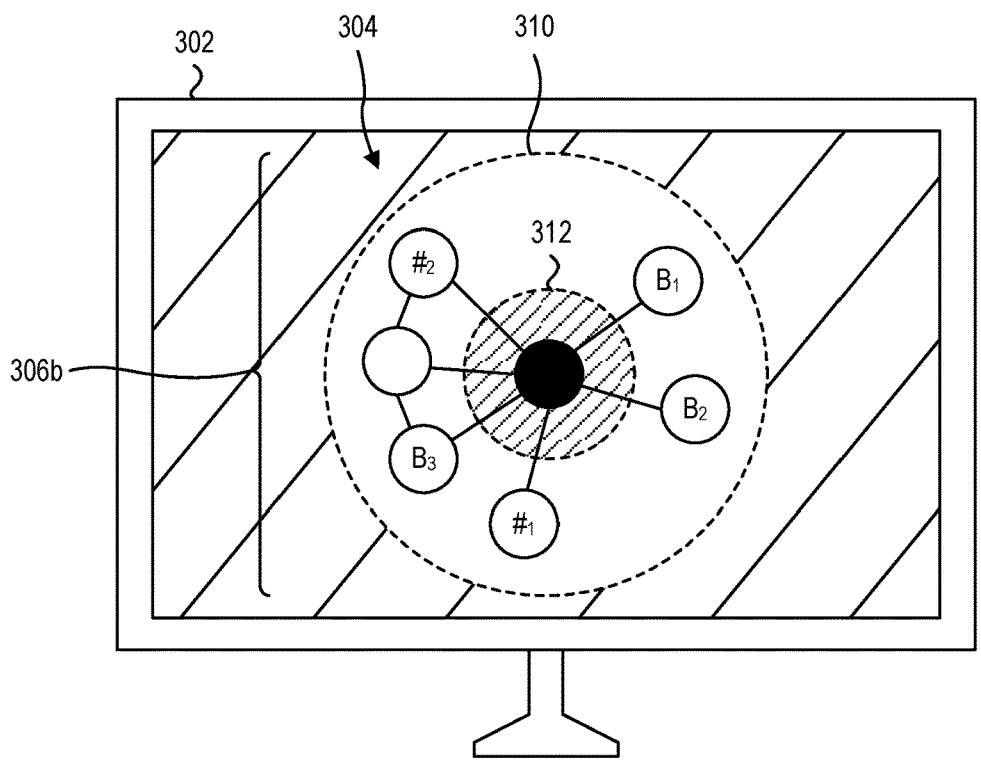
Figure 3C:
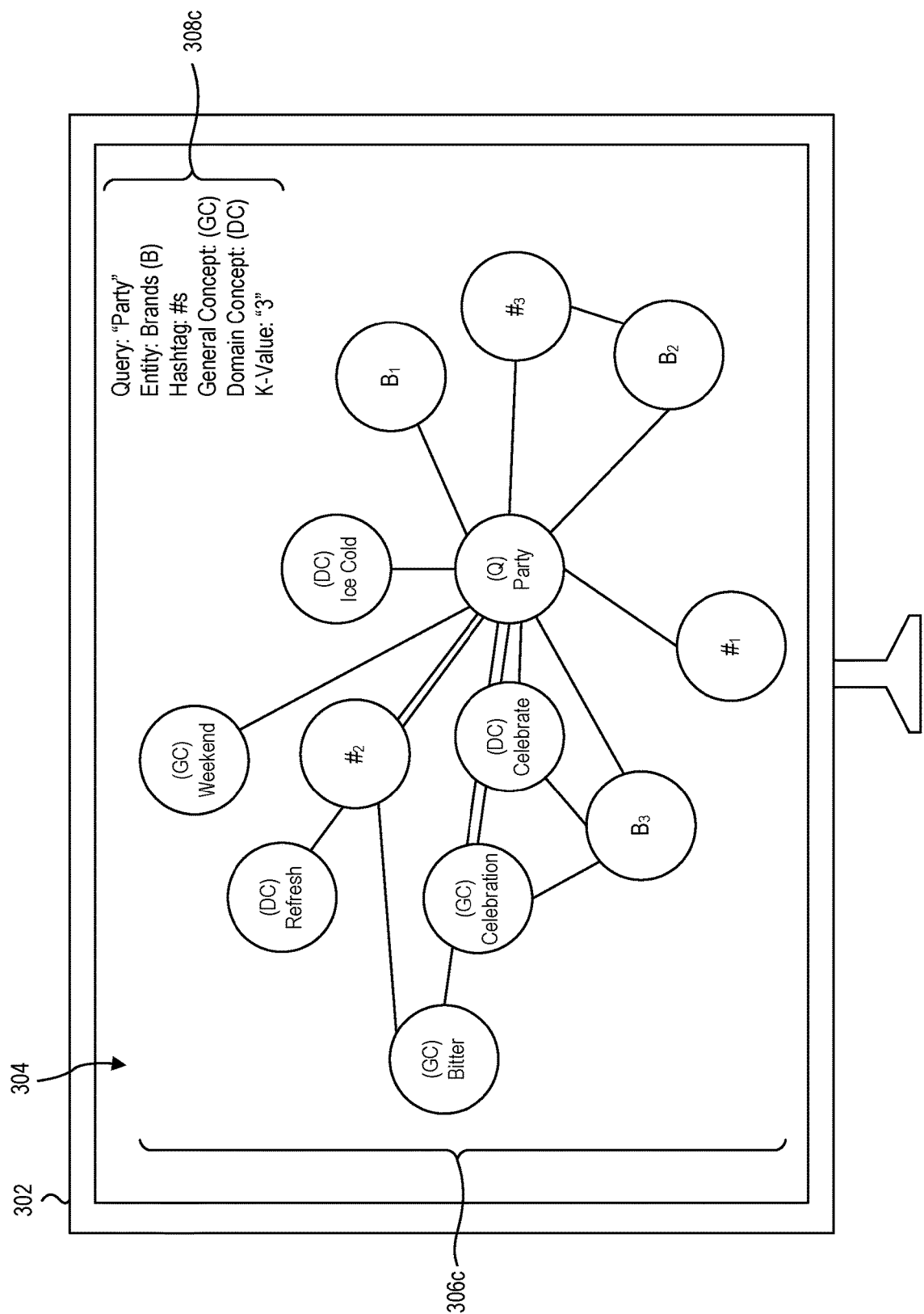

More specifically, FIGS. 3A-3C provide example presentations of a correlation graph object in view of graph queries having different properties and characteristics as well as various parameters that may be considered in generating and presenting the correlation graph object. It will be understood that these implementations are provided by way of example and not limitation. Thus, one or more features or functionalities described in connection with one or more example implementations may similarly apply to other implementations. Accordingly, each of the features discussed below can be combined or omitted in connection with other examples and implementations described herein. Moreover, while the following examples are described specifically in a domain that involves entities of interest consisting mostly of drink brands, features described herein may be applicable to entities of interest for other industries, products, services, concepts, and/or other domain-specific entities.

FIG. 3A illustrates an example implementation of a graph object presentation in accordance with one or more embodiments. For example, FIG. 3A shows an example in which a query is received that includes a query term indicating a specific entity of interest or concept of interest. Based on the provided query term, the graph query application 110 may evaluate the correlation graph object to identify a set of entities of interest, concepts, hashtags, or other output classes that may be included within the graph object. More specifically, the graph query application 110 may identify the query term within the searchable matrix to identify a set of concepts, entities, and other output classes that have the highest correlation score relative to the query term.

In one or more embodiments, the query term is any term that is included within the searchable matrix of the correlation graph object. This may include any of the concepts, entities of interest, hashtags, or other term of some other object class that components of the query graph generation system 108 considered in generating the correlation graph object. Because the concept engine was trained to detect presence of 3000-4000 concepts, and because the entities of interest likely include any additional terms for which an individual would be interested, the query is more than likely represented within the correlation graph object or, in the least, may be included as an entity of interest in the classification stage discussed above in connection with the entity classification manager 118.

As will be discussed in further detail below, the graph query application 110 may process the graph query in a number of ways and based on a variety of inputs. For example, upon receiving a query of a particular term or concept, the graph query application 110 may match the query to closest concepts within a corpus of the graph object (e.g., entities of interest, hashtags, concepts). Optionally, the graph query application 110 may perform a semantic search returning one or more closest words in a listing of concepts and retrieving a corresponding graph result.

In one or more embodiments, the graph query application 110 may apply a breadth first search algorithm to traverse connected nodes to the given query. The graph query application 110 may display an edge and corresponding node(s) within the presentation of the query object based on a correlation value for the edge surpassing a predetermined algorithms or being within a high threshold number of correlations for the query term(s). In one or more embodiments, the graph query application 110 provides a presentation including a predetermined number of nodes corresponding to the top nodes from an output class that are retrieved for the query term.

As shown in FIG. 3A, an example client device 302 may include a graphical user interface 304 on which a first presentation 306a of the query result is shown. In one or more embodiments, the graphical user interface 304 may further include a presentation key 308a showing output classes represented by the various nodes displayed within the first presentation 306a. In this example, the first presentation 306a includes a query node at a central location surrounded by a plurality of brand nodes. The brand nodes may be examples of any entity of interest node applicable to other query results. The presentation 306a may further include a plurality of hashtag nodes. The first presentation 306a may also include a plurality of concept nodes.

As shown in FIG. 3A, the graph query application 110 may position the respective nodes relative to the query node based on correlation scores between the respective concepts, hashtags, and brands and the query term(s). For example, where a second hashtag node ($\#_2$) is positioned closer to the query node than a first hashtag node ($\#_1$) or a third hashtag node ($\#_3$), this may indicate that the second hashtag node has a higher correlation within a subset of digital content items than the first or third hashtag nodes. Nevertheless, the presence of the first, second, and third hashtag nodes may indicate that each of the displayed hashtag nodes co-occur at a higher rate than other hashtags that were associated with respective digital content items from the subset of digital content items (e.g., exclusive of one or more hashtags that may have been excluded as a result of being considered universal with respect to the query term). Similarly, each of the brand nodes and concept nodes may be positioned relative to the query node based on a correlation score between the query term and the respective brands and/or concepts.

Optionally, the brand nodes, concept nodes, and/or hashtag nodes may be positioned relative to one another based on correlation scores between one another. In one or more embodiments, the first presentation 306a may further indicate correlations between the non-query nodes by providing edges between respective nodes. By way of example, the graph query application 110 may display an edge between the second brand node and the third hashtag node to indicate a correlation score above a threshold value between the respective nodes.

FIG. 3B illustrates another example implementation of a graph object presentation in which a query is received that includes a query term that indicates a specific entity of interest, concept of interest, a hashtag, or other term represented within the correlation graph object. Similar to FIG. 3A, FIG. 3B illustrates an example client device 302 having a graphical user interface 304 and showing a second presentation 306b showing a portion of the nodes discussed above in connection with FIG. 3A.

As shown in FIG. 3B, a query may indicate one or more thresholds associated with minimum and maximum correlation values that should be represented within the second presentation 306b. For example, as part of the graph query, a user of the client device 302 may provide a minimum correlation threshold 310 and/or a maximum correlation threshold 312 to include within the second presentation 306b. In this example, the provided thresholds 310-312 may filter out or otherwise prevent display of one or more nodes shown in the first presentation 306a discussed above in connection with FIG. 3A. As a result, the second example presentation 306b may include three brand nodes, two hashtag nodes, and a single concept node that are displayed within the range of displayable correlation values indicated within the graph query.

Moreover, it will be noted that while one or more embodiments described herein involve filtering out the rare and/or universal concepts and correlations as part of the process of constructing the correlation graph object, in one or more embodiments, the graph query application 110 may optionally filter out universal and/or rare concepts and correlations during the presentation stage. For example, in one or more embodiments, filtering of these concepts may be performed on processing the query graph by filtering out any concepts having correlation scores that are less than a minimum threshold or greater than a maximum threshold (e.g., as an alternative or in addition to filtering out universal and/or rare correlations when constructing the graph object). As shown in FIG. 3B, this may involve removing any nodes from a presentation for a query that would appear within a minimum threshold distance from the query term(s) as well as any nodes from the presentation for the query that would appear outside a maximum threshold distance from the query term(s). It will be understood that filtering out various concepts from the presentation may be enacted during the graph construction stage as discussed in connection with FIG. 2 above in addition to the presentation stage, as shown in FIG. 3B.

FIG. 3C illustrates another example presentation showing additional displayable features that may be provided by the graph query application 110 in connection with processing a graph query and providing a presentation of the correlation graph object in accordance with the graph query. In this example, the graph query application 110 may receive a query indicating a term of "party." The graph query may additionally include parameters indicating a number of domain concepts and/or a k-value. As discussed above, the domain concept may refer to a subset of a collection of general concepts that may be of particular interest to a user. The k-value may indicate a maximum number of nodes for a particular output class that should be displayed within a query output (e.g., a presentation of the graph object with respect to a particular query).

As shown in FIG. 3C, the graph query application 110 may be implemented on a client device 302 having a graphical user interface 304. The graph query application 110 may provide a third example presentation 306c showing a query node indicating the term "party" as input within a graph query. As further shown, third presentation 306c may include a plurality of brand nodes (e.g., $B_1$, $B_2$, and $B_3$) indicating the three brands having a highest correlation with the query term within the correlation graph object. The third presentation 306c may also include a plurality of domain concept nodes (e.g., "celebrate," "refresh," and "ice cold") having a highest correlation with the query term within the correlation graph object. The third presentation 306c may also include a plurality of general concept nodes (e.g., "celebration," "bitter," and "weekend") having a highest correlation query the query term within the correlation graph object. The third presentation 306c may also include a plurality of hashtag nodes (e.g., $\#_1$, $\#_2$, and $\#_3$) indicating hashtags having a highest correlation to the query term within the correlation graph object. As further shown, the graphical user interface 304 may include a presentation key 308c showing the respective output classes of the nodes displayed within the third presentation 306c.

Figure 4:
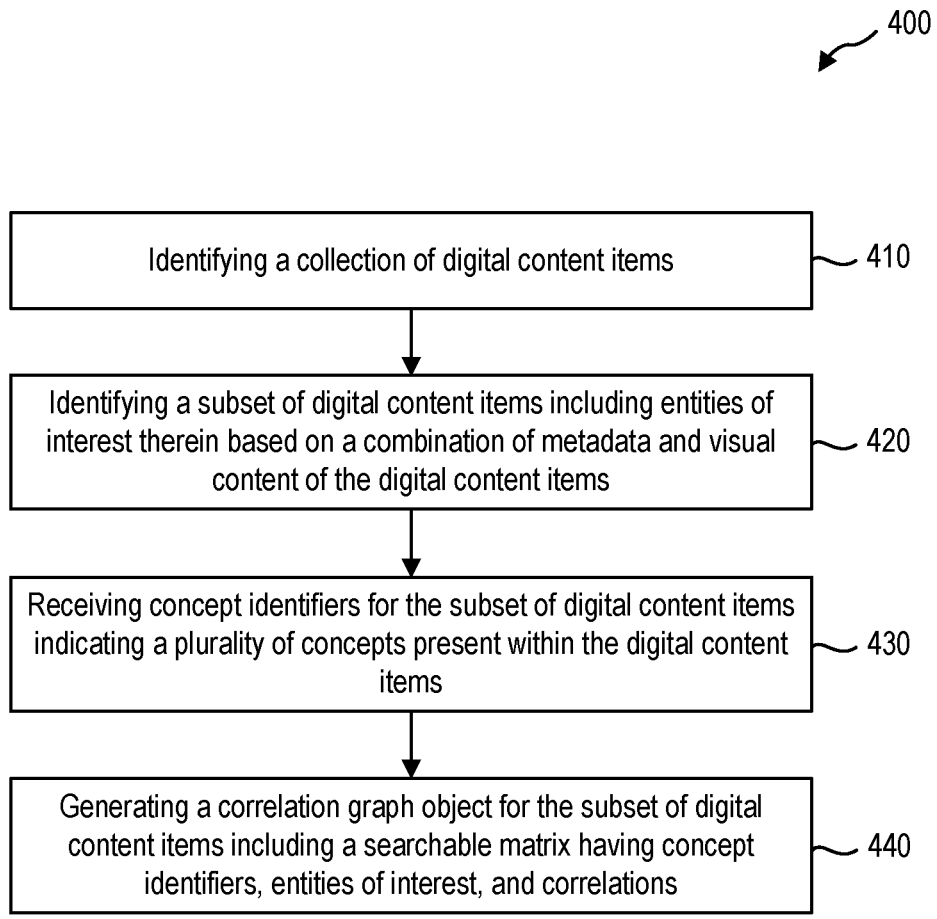
FIG. 4 illustrates an example series of acts for generating and presenting a searchable graph object in accordance with one or more embodiments.

Turning now to FIG. 4, this figure illustrates example flowcharts including series of acts for collecting digital content items and evaluating content and associated metadata for the digital content items to generate a correlation graph object that provides correlations between various entities of interest, general and/or domain concepts, hashtags, and other output classes that may be represented within the correlation graph object in accordance with one or more embodiments described herein. While FIG. 4 illustrates acts according to one or more embodiments, alternative embodiments may omit, add to, reorder, and/or modify any of the acts shown in FIG. 4. The acts of FIG. 4 can be performed as part of a method. Alternatively, a non-transitory computer-readable medium can include instructions that, when executed by one or more processors, cause a computing device to perform the acts of FIG. 4. In still further embodiments, a system can perform the acts of FIG. 4.

FIG. 4 illustrates a series of acts 400 for collecting digital content items, evaluating content and associated metadata for the digital content items, and generating a correlation graph object in accordance with one or more embodiments discussed herein. For example, as shown in FIG. 4, the series of acts 400 may include an act 410 of identifying a collection of digital content items. In one or more embodiments, identifying the collection of digital content items includes receiving a plurality of multi-media content items shared by users of a social networking system. In one or more embodiments, the multi-media content items includes one or more of digital images or digital videos.

As further shown in FIG. 4, the series of acts 400 may include an act 420 of identifying a subset of digital content items including entities of interest therein based on a combination of metadata and visual content of the digital content items. For example, in one or more embodiments, the act 420 involves applying an entity detection model to the collection of digital content items to identify a subset of digital content items from the collection of digital content items that includes one or more entities of interest within visual content of the subset of digital content items where the entity detection model is trained to detect the one or more entities of interest within a given digital content item based on a combination of metadata and visual content of the given digital content item.

As further shown in FIG. 4, the series of acts 400 may include an act 430 of receiving concept identifiers for the subset of digital content items indicating a plurality of concepts present within the digital content items. For example, in one or more implementations, the act 430 may involve receiving a set of concept identifiers for the subset of digital content items indicating a plurality of concepts estimated to be present within the subset of digital content items.

As further shown in FIG. 4, the series of acts 400 may include an act 440 of generating a correlation graph object for the subset of digital content items including a searchable matrix having concept identifiers, entities of interest, and correlations. For example, in one or more embodiments, the act 440 may involve generating a correlation graph object for the subset of digital content items where the correlation graph object includes a searchable matrix including the set of concept identifiers, the one or more entities of interest, and a plurality of correlations having correlation values indicating frequency of co-occurrence between respective entities of interest and respective content identifiers within the subset of digital content items.

In one or more embodiments, the series of acts 400 includes providing a presentation of the correlation graph object via a graphical user interface of a client device based on a graph query where the graph query includes an input term from the set of concept identifiers. The presentation of the correlation graph object may include a primary icon for the input term and a plurality of secondary icons for a subset of concept identifiers from the set of concept identifiers having correlation values indicating a higher co-occurrence of the subset of concept identifiers than other concept identifiers within the set of concept identifiers. In one or more embodiments, the plurality of secondary icons are displayed at positions on the graphical user interface relative to a location of the primary icon based on associated correlation values from the searchable matrix.

In one or more embodiments, providing the presentation of the correlation graph object includes providing the correlation graph object to the client device for local execution of the graph query. In one or more embodiments, providing the presentation of the correlation graph object via the graphical user interface is further based on one or more domain concept identifiers manually indicated by a user as being relevant to the one or more entities or interest or the input term. The presentation of the graph object may include one or more additional icons for the one or more domain concept identifiers.

In one or more embodiments, the metadata includes one or more hashtags associated with the given digital content item. Further, in one or more embodiments, the entity detection model is trained to detect the one or more entities of interest within the given content item based on a combination of the one or more hashtags and the visual content. In one or more embodiments, the metadata further includes a timestamp and a geolocation. Further, in one or more embodiments, the entity detection model is trained to detect the one or more entities of interest within the given content item based on a combination of the one or more hashtags, the timestamp, the geolocation, and the visual content.

In one or more embodiments, receiving the set of concept identifiers includes receiving, for each digital content item from the subset of digital content items, a plurality of probability scores for the plurality of concepts indicating a likelihood of each concept from the plurality of concepts being present within the digital content item. In one or more embodiments, the set of concept identifiers includes a listing of probability scores for each digital content item from the subset of digital content items where the listing of probability scores includes a probability score for each concept from the plurality of concepts. In one or more embodiments, the plurality of probability scores are output by a concept detection model having been trained to determine, for each concept from the plurality of concepts, a probability that a given concept is present within an image.

In one or more embodiments, generating the correlation graph object includes determining correlation values between each entity of interest and each concept identifier from the set of concept identifiers based on frequency of co-occurrence with respect to digital content items from the subset of digital content items. In one or more embodiments, generating the correlation graph further includes removing a first set of correlations from the plurality of correlations based on corresponding correlation values being greater than or equal to a maximum threshold value and removing a second set of correlations from the plurality of correlations based on corresponding correlation values being less than or equal to a minimum threshold value. In one or more embodiments, the maximum threshold value is a first threshold percentile (e.g., a max threshold percentile) while the minimum threshold value is a second threshold percentile (e.g., a minimum threshold percentile).

Figure 5:
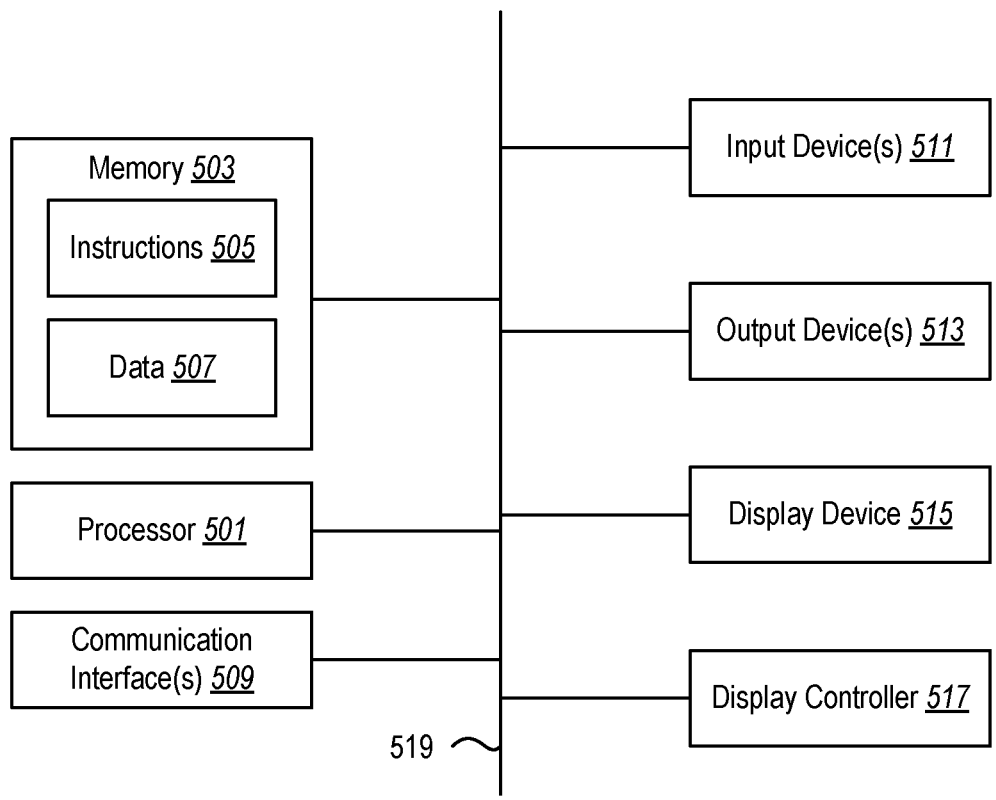
FIG. 5 illustrates certain components that may be included within a computer system.

FIG. 5 illustrates certain components that may be included within a computer system 500. One or more computer systems 500 may be used to implement the various devices, components, and systems described herein.

The computer system 500 includes a processor 501. The processor 501 may be a general-purpose single- or multi-chip microprocessor (e.g., an Advanced RISC (Reduced Instruction Set Computer) Machine (ARM)), a special-purpose microprocessor (e.g., a digital signal processor (DSP)), a microcontroller, a programmable gate array, etc. The processor 501 may be referred to as a central processing unit (CPU). Although just a single processor 501 is shown in the computer system 500 of FIG. 5, in an alternative configuration, a combination of processors (e.g., an ARM and DSP) could be used. In one or more embodiments, the computer system 500 further includes one or more graphics processing units (GPUs), which can provide processing services related to both entity classification and graph generation.

The computer system 500 also includes memory 503 in electronic communication with the processor 501. The memory 503 may be any electronic component capable of storing electronic information. For example, the memory 503 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 505 and data 507 may be stored in the memory 503. The instructions 505 may be executable by the processor 501 to implement some or all of the functionality disclosed herein. Executing the instructions 505 may involve the use of the data 507 that is stored in the memory 503. Any of the various examples of modules and components described herein may be implemented, partially or wholly, as instructions 505 stored in memory 503 and executed by the processor 501. Any of the various examples of data described herein may be among the data 507 that is stored in memory 503 and used during execution of the instructions 505 by the processor 501.

A computer system 500 may also include one or more communication interfaces 509 for communicating with other electronic devices. The communication interface(s) 509 may be based on wired communication technology, wireless communication technology, or both. Some examples of communication interfaces 509 include a Universal Serial Bus (USB), an Ethernet adapter, a wireless adapter that operates in accordance with an Institute of Electrical and Electronics Engineers (IEEE) 802.11 wireless communication protocol, a Bluetooth® wireless communication adapter, and an infrared (IR) communication port.

A computer system 500 may also include one or more input devices 511 and one or more output devices 513. Some examples of input devices 511 include a keyboard, mouse, microphone, remote control device, button, joystick, trackball, touchpad, and lightpen. Some examples of output devices 513 include a speaker and a printer. One specific type of output device that is typically included in a computer system 500 is a display device 515. Display devices 515 used with embodiments disclosed herein may utilize any suitable image projection technology, such as liquid crystal display (LCD), light-emitting diode (LED), gas plasma, electroluminescence, or the like. A display controller 517 may also be provided, for converting data 507 stored in the memory 503 into text, graphics, and/or moving images (as appropriate) shown on the display device 515.

The various components of the computer system 500 may be coupled together by one or more buses, which may include a power bus, a control signal bus, a status signal bus, a data bus, etc. For the sake of clarity, the various buses are illustrated in FIG. 5 as a bus system 519.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular datatypes, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method, comprising:
    identifying a collection of digital content items;
    applying an entity detection model to the collection of digital content items to identify a subset of digital content items from the collection of digital content items that includes one or more entities of interest within visual content of the subset of digital content items, wherein the entity detection model is trained to detect the one or more entities of interest within a given digital content item based on a combination of metadata and visual content of the given digital content item;
    providing the subset of digital content items as inputs to a concept detection model, the concept detection model being trained to predict whether one or more concepts from a collection of concepts exist within an input digital content item;
    receiving a set of concept identifiers for the subset of digital content items output by the concept detection model, the set of concept identifiers indicating a plurality of concepts estimated to be present within the subset of digital content items;
    determining correlation values for a plurality of correlations indicating frequencies of co-occurrences between each entity of interest from the one or more entities of interest and each concept from the plurality of concepts; and
    generating a correlation graph object for the subset of digital content items, the correlation graph object including a searchable matrix including the set of concept identifiers, the one or more entities of interest, and a subset of correlations from the plurality of correlations having correlation values indicating frequency of co-occurrence between respective entities of interest and respective content identifiers within the subset of digital content items, the subset of correlations excluding a first one or more correlations having correlation scores below a minimum threshold value and a second one or more correlations having correlation scores above a maximum threshold value.

2. The method of claim 1, wherein identifying the collection of digital content items includes receiving a plurality of multi-media content items shared by users of a social networking system.

3. The method of claim 2, wherein the multi-media content items include one or more of digital images or digital videos.

4. The method of claim 1, further comprising providing a presentation of the correlation graph object via a graphical user interface of a client device based on a graph query, the graph query including an input term from the set of concept identifiers, and wherein the presentation of the correlation graph object includes:
- a primary icon for the input term; and
- a plurality of secondary icons for a subset of concept identifiers from the set of concept identifiers having correlation values indicating a higher co-occurrence of the subset of concept identifiers than other concept identifiers within the set of concept identifiers,
- wherein the plurality of secondary icons are displayed at positions on the graphical user interface relative to a location of the primary icon based on associated correlation values from the searchable matrix.

5. The method of claim 4, wherein providing the presentation of the correlation graph object includes providing the correlation graph object to the client device for local execution of the graph query.

6. The method of claim 4, wherein providing the presentation of the correlation graph object via the graphical user interface is further based on one or more domain concept identifiers manually indicated by a user as being relevant to the one or more entities or interest or the input term, and wherein the presentation of the graph object further includes one or more additional icons for the one or more domain concept identifiers.

7. The method of claim 1, wherein the metadata includes one or more hashtags associated with the given digital content item, and wherein the entity detection model is trained to detect the one or more entities of interest within the given content item based on a combination of the one or more hashtags and the visual content.

8. The method of claim 7, wherein the metadata further includes a timestamp and a geolocation, and wherein the entity detection model is trained to detect the one or more entities of interest within the given content item based on a combination of the one or more hashtags, the timestamp, the geolocation, and the visual content.

9. The method of claim 1, wherein receiving the set of concept identifiers includes receiving, for each digital content item from the subset of digital content items, a plurality of probability scores for the plurality of concepts indicating a likelihood of each concept from the plurality of concepts being present within the digital content item.

10. The method of claim 9, wherein the set of concept identifiers includes a listing of probability scores for each digital content item from the subset of digital content items, the listing of probability scores including a probability score for each concept from the plurality of concepts.

11. The method of claim 9, wherein the plurality of probability scores is output by the concept detection model trained to determine, for each concept from the plurality of concepts, a probability that a given concept is present within an image.

12. The method of claim 1, wherein the maximum threshold value is a first threshold percentile, and wherein the minimum threshold value is a second threshold percentile.

13. A system, comprising:
- one or more processors;
- memory in electronic communication with the one or more processors;
- instructions stored in the memory, the instructions being executable by the one or more processors to:
  - identify a collection of digital content items;
  - apply an entity detection model to the collection of digital content items to identify a subset of digital content items from the collection of digital content items that includes one or more entities of interest within visual content of the subset of digital content items, wherein the entity detection model is trained to detect the one or more entities of interest within a given digital content item based on a combination of metadata and visual content of the given digital content item;
  - provide the subset of digital content items as inputs to a concept detection model, the concept detection model being trained to predict whether one or more concepts from a collection of concepts exists within an input digital content item;
  - receive a set of concept identifiers for the subset of digital content items output by the concept detection model, the set of concept identifiers indicating a plurality of concepts estimated to be present within the subset of digital content items;
  - determine correlation values for a plurality of correlations indicating frequencies of co-occurrences between each entity of interest from the one or more entities of interest and each concept from the plurality of concepts; and
  - generate a correlation graph object for the subset of digital content items, the correlation graph object including a searchable matrix including the set of concept identifiers, the one or more entities of interest, and a subset of correlations from the plurality of correlations having correlation values indicating frequency of co-occurrence between respective entities of interest and respective content identifiers within the subset of digital content items, the subset of correlations excluding a first one or more correlations having correlation scores below a minimum threshold value and a second one or more correlations having correlation scores above a maximum threshold value.

14. The system of claim 13, further comprising instructions being executable by the one or more processors to provide a presentation of the correlation graph object via a graphical user interface of a client device based on a graph query, the graph query including an input term from the set of concept identifiers, and wherein the presentation of the correlation graph object includes:
- a primary icon for the input term; and
- a plurality of secondary icons for a subset of concept identifiers from the set of concept identifiers having correlation values indicating a higher co-occurrence of the subset of concept identifiers than other concept identifiers within the set of concept identifiers,
- wherein the plurality of secondary icons are displayed at positions on the graphical user interface relative to a location of the primary icon based on associated correlation values from the searchable matrix.

15. The system of claim 13, wherein the metadata includes one or more hashtags associated with the given digital content item, and wherein the entity detection model is trained to detect the one or more entities of interest within the given content item based on a combination of the one or more hashtags and the visual content.

16. A non-transitory computer readable medium storing instructions thereon that, when executed by one or more processors, causes a computing device to:
- identify a collection of digital content items;
- apply an entity detection model to the collection of digital content items to identify a subset of digital content items from the collection of digital content items that includes one or more entities of interest within visual content of the subset of digital content items, wherein the entity detection model is trained to detect the one or more entities of interest within a given digital content item based on a combination of metadata and visual content of the given digital content item;

provide the subset of digital content items as inputs to a concept detection model, the concept detection model being trained to predict whether one or more concepts from a collection of concepts exists within an input digital content item;

receive a set of concept identifiers for the subset of digital content items output by the concept detection model, the set of concept identifiers indicating a plurality of concepts estimated to be present within the subset of digital content items;

determine correlation values for a plurality of correlations indicating frequencies of co-occurrences between each entity of interest from the one or more entities of interest and each concept from the plurality of concepts; and generate a correlation graph object for the subset of digital content items, the correlation graph object including a searchable matrix including the set of concept identifiers, the one or more entities of interest, and a subset of correlations from the plurality of correlations having correlation values indicating frequency of co-occurrence between respective entities of interest and respective content identifiers within the subset of digital content items, the subset of correlations excluding a first one or more correlations having correlation scores below a minimum threshold value and a second one or more correlations having correlation scores above a maximum threshold value.

17. The non-transitory computer readable medium of claim 16, wherein the metadata includes one or more hashtags associated with the given digital content item, and wherein the entity detection model is trained to detect the one or more entities of interest within the given content item based on a combination of the one or more hashtags and the visual content.

18. The system of claim 13, wherein identifying the collection of digital content items includes receiving a plurality of multi-media content items shared by users of a social networking system, and wherein the multi-media content items include one or more of digital images or digital videos.

19. The system of claim 13, wherein the maximum threshold value is a first threshold percentile, and wherein the minimum threshold value is a second threshold percentile.

20. The non-transitory computer readable medium of claim 16, wherein identifying the collection of digital content items includes receiving a plurality of multi-media content items shared by users of a social networking system, and wherein the multi-media content items include one or more of digital images or digital videos.

* * * * *